Jan. 27, 1942. H. D. HYMAN 2,270,847
MIXING TANK
Filed March 27, 1941

INVENTOR
Howard D. Hyman
BY
ATTORNEYS

Patented Jan. 27, 1942

2,270,847

UNITED STATES PATENT OFFICE 2,270,847

MIXING TANK

Howard Davison Hyman, Ottawa, Ontario, Canada, assignor to J. R. Booth, Limited, Ottawa, Ontario, Canada, a corporation of Canada Application March 27, 1941, Serial No. 385,482
In Canada January 27, 1941

8 Claims. (Cl. 259—95)

The invention relates to apparatus for circulating, mixing and agitating liquid, semi-liquid or viscous substances, mixtures or compounds.

The invention is particularly suitable for the treatment of wood, rag or other pulp for use in paper manufacture but is not limited to such use.

The invention has for its object to provide an improved apparatus comprising a tank in which, during processing of the material, horizontal stratification of the material takes place, whereby uniform processing is ensured.

A further object is to provide an apparatus for increasing thoroughness of mixing.

Further objects are to facilitate emptying of the apparatus, and to provide an apparatus which can be easily cleaned and in which there are no pockets or obstructions to stop or retard the material or interfere in any way with the desired steady and uniform passage of the material through the apparatus.

The invention consists in the combination and arrangement of parts hereinafter fully described and more particularly pointed out in the appended claims.

Referring now to the accompanying drawing, which illustrates diagrammatically certain embodiments of the invention.

Figure 1:
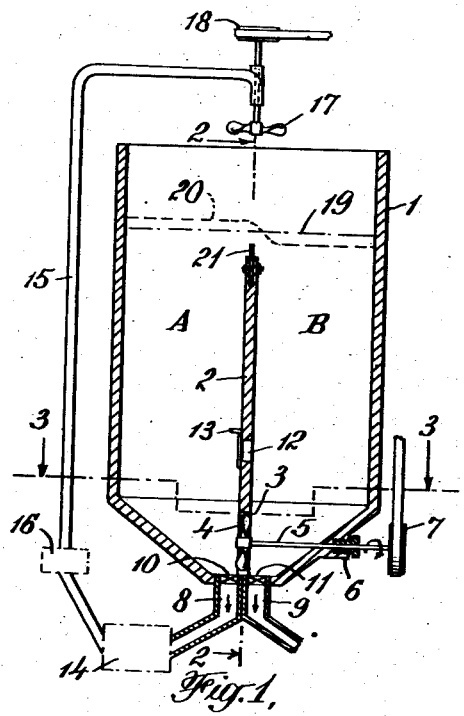
Figure 1 is a vertical cross sectional elevation of one form of the improved apparatus.
Figure 2:
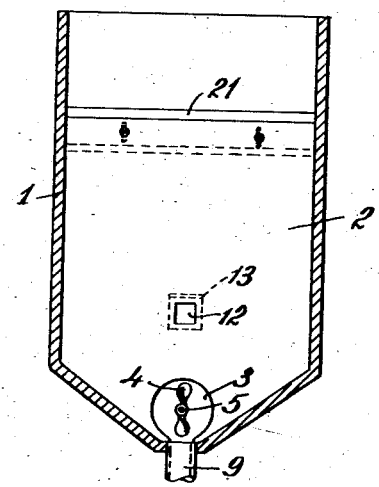
Figure 2 is a vertical section on line 2—2 of Figure 1.
Figure 3:
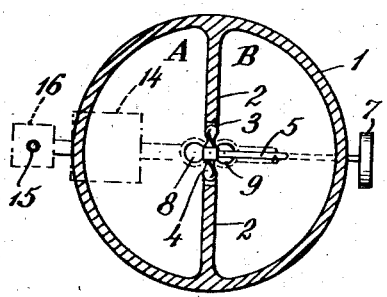
Figure 3 is a sectional plan view on line 3—3 of Figure 1.

The apparatus shown in Figures 1 to 3 comprises a tank or vessel 1 provided with a vertical partition or mid-feather 2. The top of the partition 2 is horizontal and is arranged a suitable distance below the top of the tank 1. The bottom of the partition is formed with a circular opening 3 in which an impelling device 4 is arranged to operate. The device 4 may be of any desired type, for example a propeller with radial blades of variable pitch. The impelling device is driven by any convenient means, such as shaft 5, mounted rotatably in a liquid-tight bearing 6 in a wall of the tank 1, and driven by a belt and pulley indicated diagrammatically at 7.

The tank 1 may be made of any convenient material or materials and may be of any suitable size and shape depending on the requirements of the process to be carried out. The horizontal cross section may be circular, as illustrated, or square, rectangular, elliptical or any other desired shape. The vertical cross section also may be varied to suit any particular processing requirements.

The bottom part of the tank 1 is preferably conical, and at its lowest point is provided with outlets 8 and 9 provided with valves 10 and 11 respectively.

It will be understood that the outlets 8 and 9 may be connected to the tank through a single two-way valve, if desired, instead of through two separate valves, or a single outlet 8 provided.

One or more by-pass openings such as 12, controlled by an adjustable gate 13, may be provided at any desired point or points in the partition 2.

Suitable external connections are indicated in Figure 1 for use in the treatment of a pulp suspension such as is to be used subsequently in the manufacture of paper. These connections may conveniently consist of a processing device such as a pulp refiner 14 connected to the outlet 8.

Means are provided for conveying the processed material discharged from the device 14 to the top of the tank 1. For example, the discharge of the device 14 may be connected to a pipe 15 leading up to the top of the tank 1. If the device 14 is not of a type which will create the required pressure in pipe 15 a pump 16 may be provided for this purpose, or alternatively the processed material from the device 14 can be carried up to the top of the tank by a mechanical conveyor of any suitable type not illustrated.

Any convenient means, such as a fan 17, rotated, if necessary, by a drive 18, may be provided to spread, and evenly distribute, the processed material discharged from the upper end of pipe 15. The spreader may be especially desirable when viscous materials are being treated.

One method of employing the improved apparatus will now be described:

The mixture to be processed is introduced into the top of the tank 1 in any convenient manner until the tank is filled to some level such as 19 shown in Figure 1. The valve 10 is opened allowing the mixture to leave the tank through outlet 8 to the processing device 14 where it undergoes the desired treatment. After processing the mixture is conveyed to and discharged into the top of the tank 1 by the means previously described or by any equivalent means.

Thus, as the process goes on, the level of the mixture in the tank 1 will remain at all times substantially at 19 and the material will be fed very evenly, without agitation or mixing, down through compartments A and B of the tank 1 to the processing equipment 14 and back to the top of the tank. The treatment received by the material in the processing equipment 14 will be uniform throughout the batch because no pocketing is possible and if the process is carried on for a reasonable length of time, each small portion of the mixture will be treated exactly the same as all other portions and extreme uniformity can be expected throughout the batch. This uniformity of treatment is an important advantage of the apparatus and results in a virtual stratification of the mixture.

When this phase is complete the valve 10 is closed and the impeller or agitator 4 is put in motion to cause the mixture to be moved through the opening 3, and the motion of the mixture will be downward in compartment B and upward in compartment A and the mixture will flow over the partition 2, the top of the mixture then assuming some such shape as that indicated by the line 20 (Figure 1). The opening 12 may be either fully opened or may be partially opened to permit a portion of the mixture to pass through the opening from compartment A to compartment B for purposes of intermixing. If desired, the impelling mechanism may also incorporate elements intended to perform further processing operations on the mixture, as will be readily understood.

At this point it is possible, if desired, to introduce into the tank 1, in any suitable manner, any fluids, solids or gases which it is desired to add to the mixture. In the case of paper pulp this might, for example, be water, steam, size, alum, acid, starch, silicate clay, et cetera. Very rapid and thorough mixing will be obtained. This quick and thorough mixing in the tank is another great advantage of the apparatus.

When the mixing operation is completed the valve 11 is opened and the tank 1 empties itself very rapidly and very thoroughly through outlet 9. When pulp is being treated the outlet 9 would generally be connected to some other tank such as is known as the beater or machine chest, or if desired, the tank may be emptied by providing a valve in pipe 15 through which the contents of the tank may be pumped to any desired place. The rapid and thorough emptying of the tank is still another important advantage of the improved apparatus.

An important advantage lies in the fact that the tank can be washed, when necessary, very readily, as everything is accessible from the top of the tank, and by using a hose or suitable shower the washing can be done very rapidly. This is the fourth object of the apparatus.

It will be seen that, if desired, the impelling mechanism can be operated while the processing is going on. There may be certain disadvantages to this method of operation but it will be of importance when treating suspensions containing very heavy solid matter which tends to settle out quickly, making agitation necessary. Or, if desired, this method of operation can be carried on as an additional operation after the "stratifying" method is used and before the addition of chemicals or other substances.

If the material contains objectionable lumps of solid matter, it is advisable to pass the mixture through the refiner once with the agitator stopped, to remove the lumps and the processing may then be continued with the agitator operating, if desired.

The height of partition 2 may be made adjustable, if desired, for example, as indicated at 21 in Figure 1.

Figure 4:
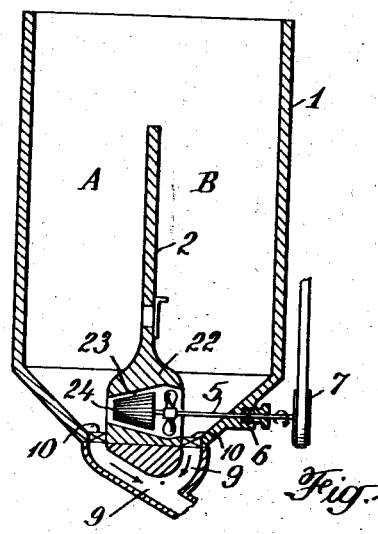
Figure 4 is a vertical section of a modified form of the invention.

A further possible modification of the apparatus is indicated in Figure 4. In Figure 4 similar reference characters are used to indicate the parts which are similar to those shown in Figure 1. The lower part of the partition 2 may be of increased thickness as indicated at 22 and the impeller opening 23 may be shaped, for example, conically, so as to co-act in the desired manner with the processing element indicated at 24. In the illustrated example the processing element is mounted on the end of the impeller shaft 5 for rotation therewith.

By thus combining the impelling and processing mechanisms it is possible to obtain the same objects and benefits and to eliminate the exterior apparatus and connections. In Figure 4 the flow is at all times downward in compartment B and upward in compartment A and over the partition 2. Processing is effected by keeping the refining or processing element 24 in close contact with or proximity to the surface of opening 23. When mixing is desired the spacing of element 24 and surface 23 is increased to allow the impelling mechanism 4 to circulate an increased volume. The processing mechanism 24 can be adjusted as desired, in a great many ways, as by using conical elements for instance or expanding outer rings or collapsible rotating elements, as will be readily understood by those skilled in the art. The details of the processing equipment are not illustrated as these, in themselves, form no part of the invention.

In the arrangement shown in Figure 4 the outlet 8 of Figure 1 is not required, but the emptying outlet 9 is shown as being branched at the top, each branch having a valve 10 arranged on opposite sides of the partition 2.

The foregoing description and accompanying drawing are given by way of example only and any further modifications within the scope of the appended claims may be resorted to without departing from the invention.

What I claim is:

1. Circulating and mixing apparatus for paper pulp stock and the like comprising a tank having a partition dividing said tank into two vertical compartments communicating with each other at the top, a valve controlled outlet communicating with both compartments of the tank and located at the lowest point of said tank, all portions of the bottom of the tank having a downward slope toward said outlet, said partition having an opening in its lower portion through which said compartments are placed in communication and located adjacent to said valve controlled outlet, and a rotary impeller arranged in said opening.

2. Apparatus as claimed in claim 1, in combination with processing equipment connected to the valve controlled outlet of the bottom of the tank, and means for conveying processed material discharged from said equipment to the top of said tank.

3. Apparatus as claimed in claim 1, wherein material processing equipment is provided within the tank.

4. Apparatus as claimed in claim 1, wherein material processing equipment is provided within the tank and comprises a rotatable processing element arranged in adjustable relationship to the opening in the partition.

5. Apparatus as claimed in claim 1 provided with a movable element for the processing of material within the tank and wherein the said opening in the partition is formed to coact with said element and wherein the said opening accommodates the impeller as well as the processing element.

6. Apparatus as claimed in claim 1 provided with a movable element for the processing of material within the tank and wherein the said opening in the partition is formed to coact with said element and wherein the said opening accommodates the impeller as well as the processing element and wherein a common drive is provided for the impeller and the processing element.

7. Apparatus as claimed in claim 1 in combination with processing equipment connected to the valve controlled outlet at the bottom of the tank, and means for conveying processed material discharged from said equipment to the top of said tank, said conveying means comprising a pump discharging into the top of the tank.

8. Apparatus as claimed in claim 1 in combination with processing equipment connected to the valve controlled outlet at the bottom of the tank, means for conveying processed material discharged from said equipment to the top of said tank, and spreading means at the point where the material is discharged into the top of the tank to spread the material over the surface of the body of material in both compartments of the tank.

HOWARD DAVISON HYMAN.